May 8, 1962   L. C. ZITNIK   3,033,450
CHECK DIGIT COMPUTING APPARATUS
Filed Dec. 18, 1959

INVENTOR.
LEONARD C. ZITNIK
BY Edward H Lang
ATTORNEY

United States Patent Office 3,033,450
Patented May 8, 1962

3,033,450
CHECK DIGIT COMPUTING APPARATUS
Leonard C. Zitnik, Crystal Lake, Ill., assignor to The Pure Oil Company, Chicago, Ill., a corporation of Ohio
Filed Dec. 18, 1959, Ser. No. 860,502
7 Claims. (Cl. 235—83)

This invention is directed to an apparatus for calculating self-checking digits of code numbers for keypunch machines and the like.

In modern business practice, it is customary to use code numbers to identify various accounts, such as credit-customer accounts. Business machine cards are identified by having punched thereon an appropriate code number. Errors made by keypunch-machine operators in punching out the code number on the business machine cards presented in the past a serious and troublesome problem. This difficulty has largely been solved by adding to the code number a self-checking digit number. Thus, a code number initially having 5 digits is changed to a 6 digit number by adding thereto a sixth terminal digit which is the self-checking digit. The self-checking digit is some function of the proceeding digits of the code number, and the keypunch machine is designed to punch the code number only when the self-checking digit bears the proper functional relationship to the other digits of the code number. Thus, an error of the operator in punching out the code number will result in the failure of the keypunch-machine to operate, rather than in the punching of an incorrect number.

Self-checking digits may be determined in various ways, provided only that the keypunch machine is designed so as to operate properly with a self-checking terminal digit calculated in the same manner. Thus, a code number consisting of the 5 digits, 13524 might have added thereto the self-checking terminal digit 5, 5 being the terminal digit of the integer 15, which integer is the sum of the digits comprising the code number. The five-digit code number is converted to a six-digit code number having a terminal self-checking digit. The keypunch machine to be used with such a system would have a built-in adding device which would cause the machine to jam when a key representing a sixth digit other than the last digit of the number which is the sum of the preceding five digits, is punched. Such simple methods of calculating self-checking digits have unfortunate limitations, in that not all errors of the keypunch operator would be detected and prevented. For example, the first and second digits of the code number might be transposed, the sum of the digits in the code number would not thereby be changed, and an error of transposition would go undetected.

A more elaborate system of determining self-checking digit numbers has been devised and built into commercially available keypunch machines. This system was adopted because it is capable of detecting a wide variety of possible errors and yet is not so complicated as to require an excessively expensive keypunch-machine. This system has been standardized and accepted by the business machine industry. The calculating device of this invention is adapted to provide a quick and inexpensive means for determining self-checking digits in accordance with this accepted system. Once the code number and self-checking digit have been determined, it may be copied without fear of error. However, when a code number is assigned to a new account, it is necessary that the self-checking digit corresponding to and becoming a part of that code number be calculated. The calculator of this invention provides a simple, handy device for determining the correct self-checking digit.

The system for determining self-checking digits can best be explained by way of example. Assuming that the code number 26347 has been assigned to an account, the self-checking digit is determined as follows. Every second digit of the code number, starting with the digit of highest order, is doubled. Thus, the digits 2, 3, and 7 are doubled and the numbers 4, 6, and 14 are obtained. The remaining digits of the code number are taken without modification, giving the numbers 6 and 4. The numbers thus obtained are added, but with the proviso that numbers 10 or greater are taken as being 1 plus the second digit of the number. Thus, the number 14 obtained by doubling the digit 7 of the code number is read as 1 plus 4, which equals 5. The sum of these numbers is then obtained by simple addition, $$4+6+1+4+6+4=25$$

The number thus obtained by addition is subtracted from the next-highest number ending in a zero. Since the next-highest number ending in zero is 30, the sum, 25, is subtracted from 30 to obtain the self-checking digit, 5. The completed code number is 263475. The standard keypunch machine will punch out this number in the usual manner. Errors of transposition, for example, will result in the machine determining a self-checking digit number other than 5, and hence, if an error of transposition is made, the machine will fail to function when self-checking digit 5 is punched.

Having in mind the principle of operation of the self-checking digit system, the apparatus of this invention for determining self-checking digits in accordance with this system will be described. The calculator of this invention is best described with reference to the drawings, of which:

Figure 1:
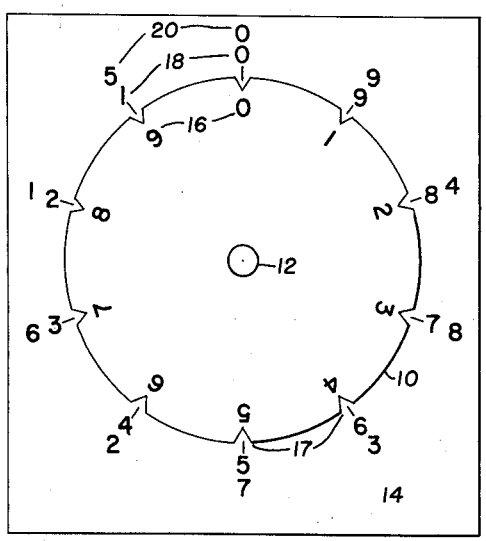
FIGURE 1 is a plan view of a calculator made in accordance with the teachings of this invention.
Figure 2:
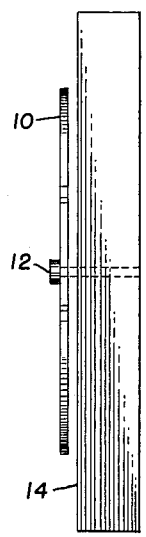
FIGURE 2 is a side-elevational view of the calculator depicted in FIGURE 1.

Referring to FIGURES 1 and 2, rotatable disc 10, which is preferably fabricated from a thin, opaque, sheet material, such as metal or plastic, pivots freely about pin 12, which pin secures disc 10 to base plate 14. The base plate may be made from metal, plastic, or wood. The pin is preferably made of steel. The face of disc 10 is marked with a set of numerals 16, which are equally spaced in a circle on the face of the disc. The numerals of set 16 range from 0 to 9 consecutively, and occur in a clockwise-ascending order. The angular interval between each numeral is 36°, there being ten numerals in all in this set. Ten notches 17 occur in the periphery of disc 10, one notch being radially adjacent to each numeral of the set. A first inner series of numerals 18 is marked on the face of base plate 14. Numerals of series 18 are arranged consecutively from 0 to 9, inclusive, in a counter-clockwise direction and are equally spaced at angles of 36° around disc 10. Base plate 14 is also marked with a second series of counter-clockwise numerals 20, arranged in a circle outside of and concentric with the circle defined by numerals 18. The outer series of numerals 20 is arranged in two consecutive groups at intervals of 72 degrees, one group including 0 to 4 and the other 5 to 9. The zero in both the inner and outer series lie along the same radius. The numeral 5 in the outer series lies on a common radius with the numeral 1 of the inner series. Thus, the second or outer series of numerals encompasses the periphery of the disc twice.

The operation of the calculator will be explained with reference to the determination of the self-checking digit for the code number 26347. Disc 10 is initially rotated until the 0 numeral appearing thereon is opposite the zero numerals marked on the face of base plate 14. The highest order digit of the code number 2, is located in the outer (double spaced) series of numerals appearing on base plate 14. The notch 17 in the periphery of disc 10, which is opposite numeral 2 in the outer series of numerals appearing on the base plate, is rotated to take a position opposite the zero point on the base plate. Then the numeral in the inner (single spaced) series corresponding to the digit of second-highest order of the code number is located, and the notch opposite this numeral is rotated to take the position opposite the zero numeral on the base plate. This procedure is continued until each of the digits in the code number has been dialed, in each instance the digit of highest order being dialed using the outside series of numbers, the second digit dialed using the inner series of numbers, the third digit dialed using the outer series of numbers, and so on, so that the first, third, fifth, etc., digits are dialed using the outer (double spaced) series of numerals, and the second, fourth, sixth, etc., digits are dialed using the inner (single spaced) series of numerals. After the last digit of the code number, here the 7, has been dialed, the correct self-checking digit, 5, appears on disc 10 opposite the zero numerals on the base plate. This self-checking digit is then combined with the code number to give the complete number to be applied by the keypunch machine.

Figure 3:
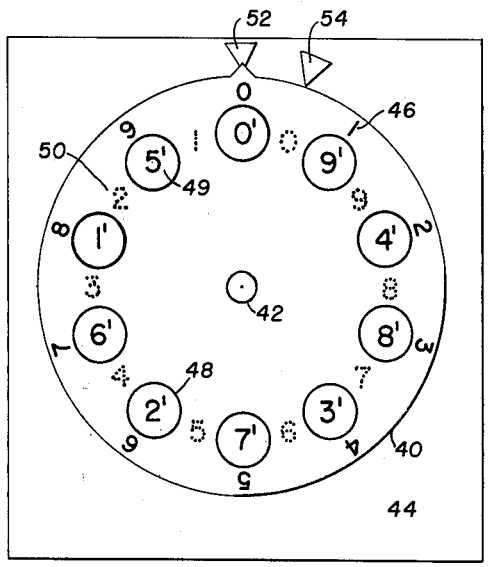
FIGURE 3 is a plan view of the calculator which is the preferred embodiment of this invention.
Figure 4:
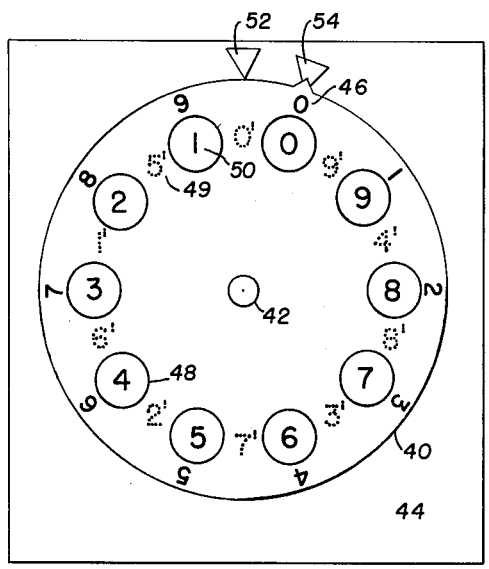
FIGURE 4 is a view of the calculator shown in FIGURE 3, the rotatable disc having been turned through an angle of 18° in a clock-wise direction.

While the apparatus thus described will function in a satisfactory manner to calculate self-checking digits, it is evident that the operator must be careful to select the correct (inner or outer) series of numbers when dialing the code number. In order to simplify the dialing procedure, and to eliminate the operator errors which might otherwise occur, the preferred embodiment of this invention depicted in FIGURES 3 and 4 was devised. Disc 40 is pivotably securred by pin 42 to base plate 44. Numerals of set 46, which range in sequence from 0 to 9, inclusive, are equally spaced on disc 40 adjacent to the periphery thereof. There being ten numerals in the set, the numerals are spaced at angles of 36° from each other. Disc 40 is penetrated by ten holes 48, which are disposed circularly on the face of the disc and preferably are located on common lines of radii with the numerals of set 46. Thus, one hole is located adjacent to and radially inward from each numeral of the set. Disc 40 is preferably fabricated from an opaque material so that only those parts of base plate 44 which are without the periphery of the disc or lie under the areas exposed by holes 48, are visible. Base plate 44 is marked with two series of numerals, 49 and 50, ranging from 0 to 9, inclusive, in a manner similar to that set out in the description of FIGURE 1. However, both series of numerals are placed along the same circle, which circle is concentric with disc 40 and of lesser diameter than the disc. The diameter of the circle along which both series of numerals are spaced is equal to the diameter of the circle upon which holes 48 in disc 40 are spaced. The two series of numerals are set off from each other by rotating one set relative to the other so that the numerals of series 49 are angularly displaced from the numerals of series 50, as shown in FIGURES 3 and 4. Thus, the numerals in series 50 are preferably spaced between the numerals in series 49 and at an angle of 18° therefrom. All of the numerals in both series can thus be spaced along a common circle coincident with the circle along which holes 48 are spaced. Thus, rotation of disc 40 to the position shown in FIGURE 3 makes visible all of the numerals of series 49. Rotation of disc 40 to the position shown in FIGURE 4 makes visible all of the numerals of series 50, and covers all of the numerals in series 49. Thus, one and only one series of numerals is visible at a given time.

Base plate 44 is further marked with two indicia 52 and 54. Indicia 52 is placed just outside of the area covered by disc 40, and on a common line of radius with the 0 numeral of series 49. Indicia 54 is placed outside of the area covered by disc 40 and on a common radius line with the 0 numeral of series 50. It is evident that the two indicia are displaced from each other by an angle of 18°. The two series of numerals appearing on base plate 44 should be so marked that they are readily distinguishable from each other. For example, the numerals in series 49 may be marked in red, and the numerals in series 50 marked in black. The indicia 52 and 54 are preferably marked opposite in color to the numeral which lies upon a common radius line with the indicia. In FIGURES 3 and 4 the numerals which would appear in red are indicated as 1', 2', 3', etc.

The method of operation of this calculator will be described using the same example used with FIGURE 1. It is desired to determine a self-checking digit for the code number 26347. Disc 40 is initially rotated so that the zero numeral of number set 46 is opposite the black indicia, thus making visible all of the red numerals marked on base plate 44, as shown in FIGURE 3. This is done because the prime (red) numerals are arranged at a double spacing, and the first third, fifth, etc., digits of the code number must be doubled. The operator merely inserts his index finger in the numeral corresponding to the highest-order integer of the code number, 2, and rotates dial 40 until his finger is opposite the indicia which corresponds in color with the exposed series of numerals, indicia 54. All of the holes 48 in the disc are now removed 18° from their initial position, exposing the black series of numerals, as shown in FIGURE 4. The operator then dials the next integer of the code number by inserting his finger in the proper hole and dialing until his finger comes to rest opposite the black indicia. This process is continued until each digit of the code number is dialed, at which time the self-checking digit will appear as that one of the set of numbers marked on disc 40 which is adjacent to the indicia to which the disc was last dialed. The complete code number thus is determined to consist of the original five digits plus the final digit indicated on the self-checking digit calculator.

It is evident that certain modifications of design may be made without influencing the function of the calculator. For example, it is not essential that the zero numbers of the two series of numerals appearing on base plate 44 be removed from each other by an angle of 18°. Other spacings may be used provided the indicia are also spaced to correspond. For example, the angular distance between the zero numerals might be 54° or 90°. Other modifications, such as the use of ten scallops in the periphery of disc 40, instead of the ten holes through the disc, may be employed. The principle of operation would remain the same, to expose one series of numerals while covering the other. Thus, the operator is relieved of the burden of having to select the correct series of numerals to dial.

The operation of the device of this invention has been described with reference to the calculation of a self-checking digit for a code number having an odd number of digits. Ordinarily, business machines are adapted to utilize self-checking digits computed by doubling the digit in the units position and in every alternate position of the basis code number. In computing the self-checking digit for basic code numbers having an odd number of digits, the operations are thus performed as afore-described. In computing the self-checking digit for a basic code number having an even number of digits, the digit of highest order will not be doubled. The digits of second, fourth, sixth, etc., highest order are those doubled. Hence, it will be understood that in using the device of this invention to compute self-checking digits for basic code numbers having an even number of digits, the zero numeral of set 46 will be rotated to take position opposite the red indicia.

Thus, the black series of numerals 50 will initially be visible, and the digit of highest order will be dialed using this black (single spaced) series of numerals.

The embodiments of the invention in which an exclusive property or privilege is claimed are defined as follows:

1. A calculator comprising a base plate and a disc rotatably secured thereto, said base plate being marked with a first series of consecutive numerals ranging from 0 to 9, inclusive, spaced around said disc so as to provide consecutive indicia at 36° intervals, said base plate being further marked with a second series of consecutive numerals ranging from 0 to 9, inclusive, those numerals of said second series ranging from 0 to 4 being spaced around said disc so as to provide consecutive indicia at 72° intervals, with the remainder of said second series numerals also being spaced around said disc so as to provide consecutive indicia at 72° intervals, the indicia provided by the numeral 5 of said second series being spaced in ascending direction at an angle of 108 degrees from the indicia provided by numeral 4 of said second series, said disc being marked with a set of consecutive numerals ranging from 0 to 9, inclusive, spaced around said disc in a direction opposite to the direction of said first and second series of numerals so as to provide consecutive indicia at 36° intervals.

2. A calculator comprising a base plate and a disc rotatably secured to said base plate, said base plate being marked with a first series of consecutive numerals ranging from 0 to 9, inclusive, equally spaced along a circle concentric with said disc, said base plate being further marked with a second series of consecutive numerals ranging from 0 to 9, inclusive, spaced along a circle concentric with said disc, those numerals of said second set ranging from 0 to 4, inclusive, being equally spaced around circle at an angular interval equal to twice the angular interval between the numerals of said first series, with the remainder of said second set of numerals being equally spaced between the numerals ranging from 0 to 4, inclusive, the numeral 5 of said second series being displaced in ascending direction from the numeral 4 of said second series by an angular internal equal to 3 times the interval between the numerals of said first series, said disc being marked with a set of consecutive numerals ranging from 0 to 9, inclusive, spaced equally around said disc in a direction opposite to the direction of said first and second series of consecutive numerals.

3. An apparatus according to claim 2 in which the numerals of said first and second series are spaced along circles of different diameters, each numerals in the first series being spaced on a common radius line with a numeral of said second series.

4. An apparatus according to claim 2 in which said first and second series of numerals are spaced along a common circle concentric with said disc, said series of numerals are offset angularly from each other, and said disc contains ten openings equally spaced along said common circle to expose all of the numerals in one series while concealing all of the numerals in the other series.

5. An apparatus according to claim 4 in which said base plate is marked with two contrasting indicia, one indicia being located radially outward from the 0 numeral of each of said two series of numerals.

6. An apparatus according to claim 5 in which each numeral marked on said disc is radially adjacent to one of said openings in said disc.

7. An apparatus according to claim 6 in which the numerals of said first series are marked so as to be readily distinguishable from the numerals of said second series.

References Cited in the file of this patent

UNITED STATES PATENTS

| | | |
|---|---|---|
| 2,646,923 | Reumerman | July 28, 1953 |
| 2,722,378 | Helmig | Nov. 1, 1955 |